(12) United States Patent
Verjans et al.

(10) Patent No.: US 8,358,071 B2
(45) Date of Patent: Jan. 22, 2013

(54) OLED LIGHTING DEVICE

(75) Inventors: Conrad Wilhelmus Adriaan Verjans, Drachten (NL); Dietrich Bertram, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 182 days.

(21) Appl. No.: 12/864,522

(22) PCT Filed: Jan. 27, 2009

(86) PCT No.: PCT/IB2009/050321
§ 371 (c)(1),
(2), (4) Date: Jul. 26, 2010

(87) PCT Pub. No.: WO2009/095850
PCT Pub. Date: Aug. 6, 2009

(65) Prior Publication Data
US 2010/0308727 A1    Dec. 9, 2010

(30) Foreign Application Priority Data

Jan. 30, 2008   (EP) .................................... 08101109

(51) Int. Cl.
*H01J 13/46*   (2006.01)

(52) U.S. Cl. .............................. 315/32; 315/51; 315/161

(58) Field of Classification Search ................ 315/32, 315/51, 161, 294; 345/76–84
See application file for complete search history.

(56) References Cited

U.S. PATENT DOCUMENTS

| 6,153,980 | A | 11/2000 | Marshall et al. |
|---|---|---|---|
| 6,787,994 | B2 | 9/2004 | Cok |
| 7,187,123 | B2 | 3/2007 | MacPherson |
| 2003/0071804 | A1 | 4/2003 | Yamazaki et al. |
| 2004/0080267 | A1* | 4/2004 | Cok ............................. 313/512 |
| 2005/0258769 | A1 | 11/2005 | Inamura |
| 2006/0022214 | A1 | 2/2006 | Morgan et al. |
| 2006/0198128 | A1 | 9/2006 | Piepgras et al. |
| 2006/0232524 | A1 | 10/2006 | Cok |
| 2006/0276024 | A1 | 12/2006 | Wang et al. |
| 2007/0091614 | A1 | 4/2007 | Kaisser et al. |

(Continued)

FOREIGN PATENT DOCUMENTS

| DE | 19962837 A1 | 7/2001 |
|---|---|---|
| EP | 1194013 A1 | 4/2002 |

(Continued)

OTHER PUBLICATIONS

Salam, P.: "7.2:OLED and LED Displays With Autonomous Pixel Matching"; 2001 SID International Symposium, Jun. 2001, SID 01 Digest, vol. XXXII, pp. 67-69.

(Continued)

*Primary Examiner* — James H Cho
(74) *Attorney, Agent, or Firm* — Mark L. Beloborodov

(57) ABSTRACT

The invention relates to a lighting device (10) adapted to fit into a corresponding socket (1). The lighting device (10) has a base or housing (12) that at least partially embeds an OLED (11) and an electronic circuit (13a, 13b) which affects the flow of electrical power from an external terminal (15a, 15b) to the OLED. The electronic circuit may comprise a memory module, a communication module, a sensor etc. for allowing an intelligent control of the OLED and for making the lighting device (10) adaptable to possible changes in driving standards.

10 Claims, 2 Drawing Sheets

U.S. PATENT DOCUMENTS

| | | |
|---|---|---|
| 2007/0108843 A1 | 5/2007 | Preston et al. |
| 2007/0132376 A1* | 6/2007 | Heo .............................. 313/505 |
| 2007/0188427 A1 | 8/2007 | Lys et al. |
| 2009/0026969 A1* | 1/2009 | Joo ............................ 315/169.3 |

FOREIGN PATENT DOCUMENTS

| | | |
|---|---|---|
| EP | 1231592 A2 | 8/2002 |
| EP | 1717876 A1 | 11/2006 |
| JP | 2007316356 A | 12/2007 |
| WO | 2007036837 A2 | 4/2007 |
| WO | 2007046030 A1 | 4/2007 |
| WO | 2007054855 A1 | 5/2007 |

OTHER PUBLICATIONS

Shinar, J.: "Organic Light Emitting Devices, A Survey"; Chapter 1, Entitled "Introduction to Organcic Light-Emitting Devices"; pp. 9-10, Springer-Verlag Publishers, 2004.

\* cited by examiner

OLED LIGHTING DEVICE

The invention relates to a lighting device that is adapted to fit into a corresponding socket and that comprises an organic light emitting diode (OLED) in a housing.

From the US 2006 198 128 A1 a method is known by which an LED together with some hardware can completely be embedded into a transparent plastic. The resulting lighting devices are for special purposes only and not suited as low-cost devices.

Based on this background it was an object of the present invention to provide an alternative lighting device, wherein it is desirable that this device is suited for mass production, a long-term use in standardized environments, and/or backward-compatible to older standards.

This object is achieved by a lighting device according to claim 1. Preferred embodiments are disclosed in the dependent claims.

A lighting device according to the present invention is adapted to fit into a corresponding (standardized) socket and comprises the following components:

a) An organic light emitting diode, as usual abbreviated OLED in the following. OLEDs have the advantage that they can be operated at low voltage, have long operational lifetime, and can be produced at low costs with large areas and in many colors. For detailed information on OLEDs, reference is made to literature (e.g. Joseph Shinar (ed.): "Organic Light Emitting Devices, A survey", Springer, 2004).

b) A housing that at least partially embeds the OLED. The housing may for example be made from plastic, particularly by injection moulding.

c) At least one external electrical terminal on the outer surface of the housing via which electrical power can be supplied to the lighting device. The arrangement and the dimension of the external terminal preferably comply with some standard, thus allowing to insert the lighting device into compatible sockets from different manufacturers.

d) An electronic circuit disposed in the housing and comprising passive and/or active electronic components (e.g. resistors, capacitors, inductances, diodes, transistors etc.) that affect the flow of electrical power from the external terminal to the OLED.

The described lighting device has the advantage to combine in one housing OLEDs and some more or less sophisticated electronic hardware that is concerned with the electrical control of the OLED. Thus there is some intelligence incorporated into the lighting device which can be exploited to achieve a more versatile control of the OLED, to implement security mechanisms, and to make the device adaptive to possible future changes in the technology and the driving methods of OLEDs. Moreover, the lighting device with its housing (base) can be made backward-compatible such that it can be exchanged in an existing socket and that the electronic components safeguard the performance of the device according to the specification of said socket, even though the OLED itself might have changed considerably.

The components of the lighting device, particularly the OLED and the housing, are preferably connected to form a unitary structure, i.e. a product which can be handled as a single unit and for instance be completely changed in case of a failure. Preferably, the OLED and the housing are connected by material bonding, i.e. on the level of atomic/molecular adhesion, for example via a glue that attaches them to each other and seals them against dust or humidity.

The electronic circuit can be implemented in many different ways and fulfill various tasks. In one particular embodiment, the electronic circuit comprises a programmable memory module for storing information that identifies the device and/or that affects the behavior of the circuit. The fact that the memory module is "programmable" means that the information stored in it can be set or changed by electronic communication. The information can be stored in the memory by the manufacturer and remain unchanged during the whole lifetime of the lighting device (e.g. if the memory module is realized as a ROM or PROM). Preferably, the information module can however be changed if necessary at any time during the usage of the lighting device. This allows for example to dynamically allocate a unique address to the lighting device in case it is used in networks with varying composition. Moreover, it will be possible in this way to adapt the control of the OLED to the current standards of the external drivers, which are likely to change in future due to ongoing rapid developments in the field of OLEDs. Thus it will be possible to make the lighting device backward compatible (with older drivers) as well as forward compatible (with new drivers not yet available at the time the lighting device was produced). Updating of the memory module could for example be achieved by reading a barcode from a new device and writing associated information (e.g. driver parameters) into the memory.

According to another embodiment, the electronic circuit comprises a switching module for changing the routing or connection of the external terminal in case of a failure. A short circuit is for example a typical failure of OLEDs; to prevent that other lighting devices used in the same network are affected by such a short, the switching module can for instance switch off and bypass the defect OLED in such a case.

The electronic circuit may optionally comprise a communication module for a uni- or bidirectional communication with external devices. Said module may for instance comprise a receiver and/or a transmitter for a wireless communication. Alternatively or additionally, it may be coupled to an external terminal (e.g. the same terminal via which power is supplied) for a communication by wire. Thus a communication with the electronic circuit can be established which allows for example to read out operating parameters, sensory data, an address etc. and/or to make changes in the electronic circuit from the outside.

According to yet another embodiment, the electronic circuit comprises a converter module for converting a voltage applied to the external terminal into a current which actually drives the OLED. Thus there is a transformation step between the external signal (voltage) and the internal effect (current), which can optionally be adapted in case of changes in the standard of external drivers.

Furthermore, the electronic circuit may be equipped with one or more sensors, for example sensors for light, temperature, sound and/or the proximity of an object like a person. The sensor(s) may be used to survey the state of the lighting device, e.g. its operating temperature, wherein said sensory information can for example be communicated to some external higher level controller.

Preferably, the aforementioned sensor(s) is/are used to provide a signal that (directly) affects the behavior of the electronic circuit. A light sensor may for example be used to adjust the brightness or color of the OLED to the ambient illumination, or a temperature sensor may be used to reduce the power consumption of the OLED in case of a threatening overheating.

The electronic circuit may particularly comprise a control module for controlling the brightness and/or the color of the OLED. As explained above, the activity of the control module may be subject to different influences, for example the signals of sensors, the contents of a memory, or information communicated to the lighting device from outside.

To keep the size of the lighting device as small as possible and compliant with a given standard, the electronic circuit is preferably disposed in some recess which is provided in the housing.

These and other aspects of the invention will be apparent from and elucidated with reference to the embodiment(s) described hereinafter. These embodiments will be described by way of example with the help of the accompanying drawings in which.

Like reference numbers or numbers differing by integer multiples of 10 refer in the Figures to identical or similar components.

It is highly probable that OLED technology will continue to change rapidly for many years. This leads to the problem that many standards for socket and base of lighting devices comprising OLEDs will follow in a short period. However, the lighting devices should be serviceable for many years.

Moreover, known OLEDs have a low efficiency, but this is expected to improve dramatically in near future. This implies that drivers defined at the moment will not be compatible with OLEDs produced in a few years. Thus there is the problem that current solutions will probable not be serviceable in a few years.

Another problem is that the typical failure behavior of an OLED is the short circuit. A common way of working is to connect a few OLEDs to a single driver. If the OLEDs are connected in a parallel scheme, then a short in one OLED will also prevent the others from lighting.

Since OLEDs will enable new applications, it is further likely that there will be a strong link between OLEDs and dynamic or interactive solutions.

To address the above issues, it is proposed to provide some intelligence near the lamp, i.e. in its base. This can make the OLEDs backwards compatible and/or shut the OLED off in case of a short. Extending the base with sensors, RF receivers or any other kind of communication electronics can furthermore create dynamic and interactive applications. Thus adding intelligence in the base will solve many problems and even extend the application fields of the OLEDs.

Figure 1:
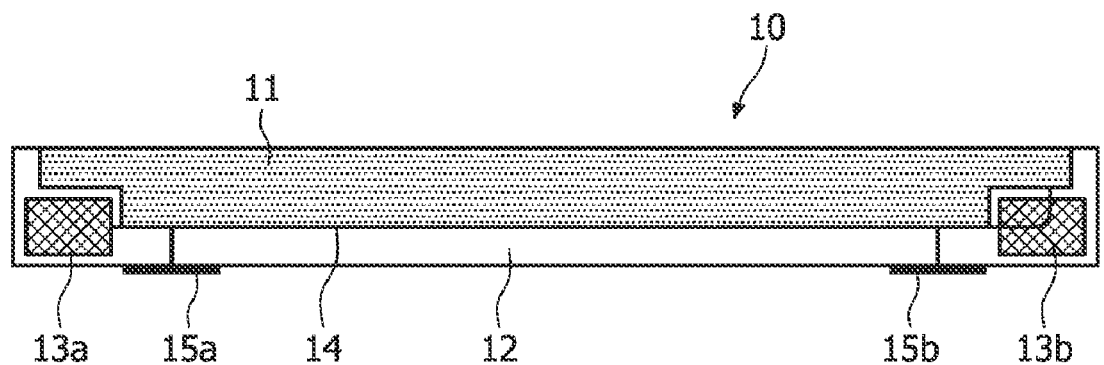
FIG. 1 shows schematically a section through a first embodiment of a lighting device according to the present invention with electronic components integrated into the housing.

FIG. 1 shows schematically a lighting device 10 according to a first embodiment of the invention that realizes the aforementioned principles. The lighting device 10 comprises three main components:

An OLED 11 which typically comprises two glass plates with a luminescent organic material in between.

A housing 12 or base which embeds the lower part of the OLED 11.

Electronic circuits 13a, 13b that are electrically integrated in the electrical path from external terminals 15a, 15b to the OLED 11.

The lighting device 10 is adapted to fit to a corresponding socket 1 with electrical terminals for providing power, which is schematically indicated in the Figure. The housing 12 of this socket-base solution protects the OLED 11. It can favorably be made out of plastic. Moreover, a two-component plastic housing can be created where one component can be used for wet plating of conductive tracks (and the other component not). Thus one can integrate conductive tracks 14 into the housing. Due to the capabilities of the moulding process for the housing, there is a 3D freedom; thus it is possible to integrate the electronic components 13a, 13b in recesses of the housing, which keeps the small form factor of the OLED intact. The conductive tracks 14 allow to add any kind of electrical component into the housing. The OLED 11 can be connected to these conductive tracks by means of welding, soldering, gluing or any other connection method. After assembling the OLED 11 and the housing 12, a filler-glue can be used to fill up air gaps and create a mechanical stable construction.

The housing 12 can contain all sorts of electrical components in the circuits 13a, 13b. This can be used for inrush-current limiting, circuit braking, efficiency adoption, sensors, dynamics, receivers, data communication, etc.

Figure 2:
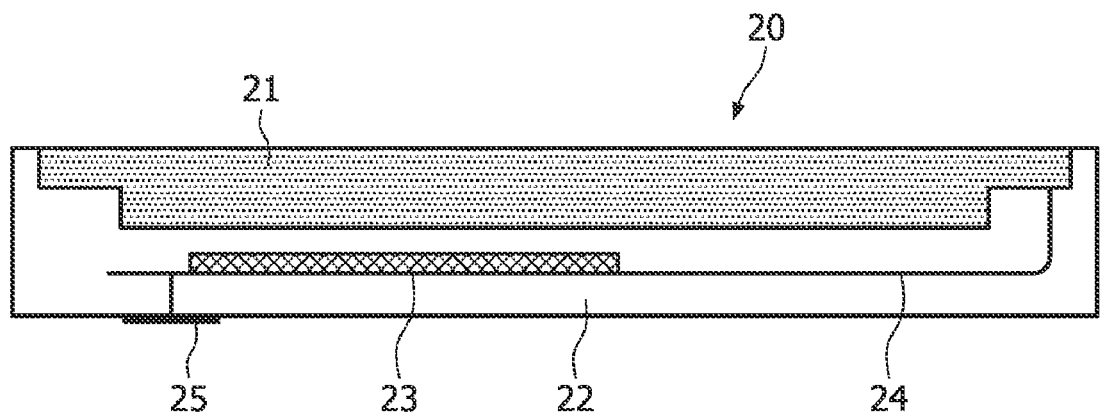
FIG. 2 shows schematically a section through a second embodiment of a lighting device according to the present invention with electronic components arranged on a printed circuit board or foil.

FIG. 2 shows an alternative embodiment of a lighting device 20. In this case, the base can be created in a more conventional way by combining a plastic or metal housing 22 with a separate printed circuit board (PCB) or foil 23, which is connected to the OLED 21 by lines 24 and further connected to an external terminal 25.

By selecting a suitable plastic, the housings 12, 22 can also serve as a heat sink. This helps to reduce thermal problems of the OLED.

Figure 3:
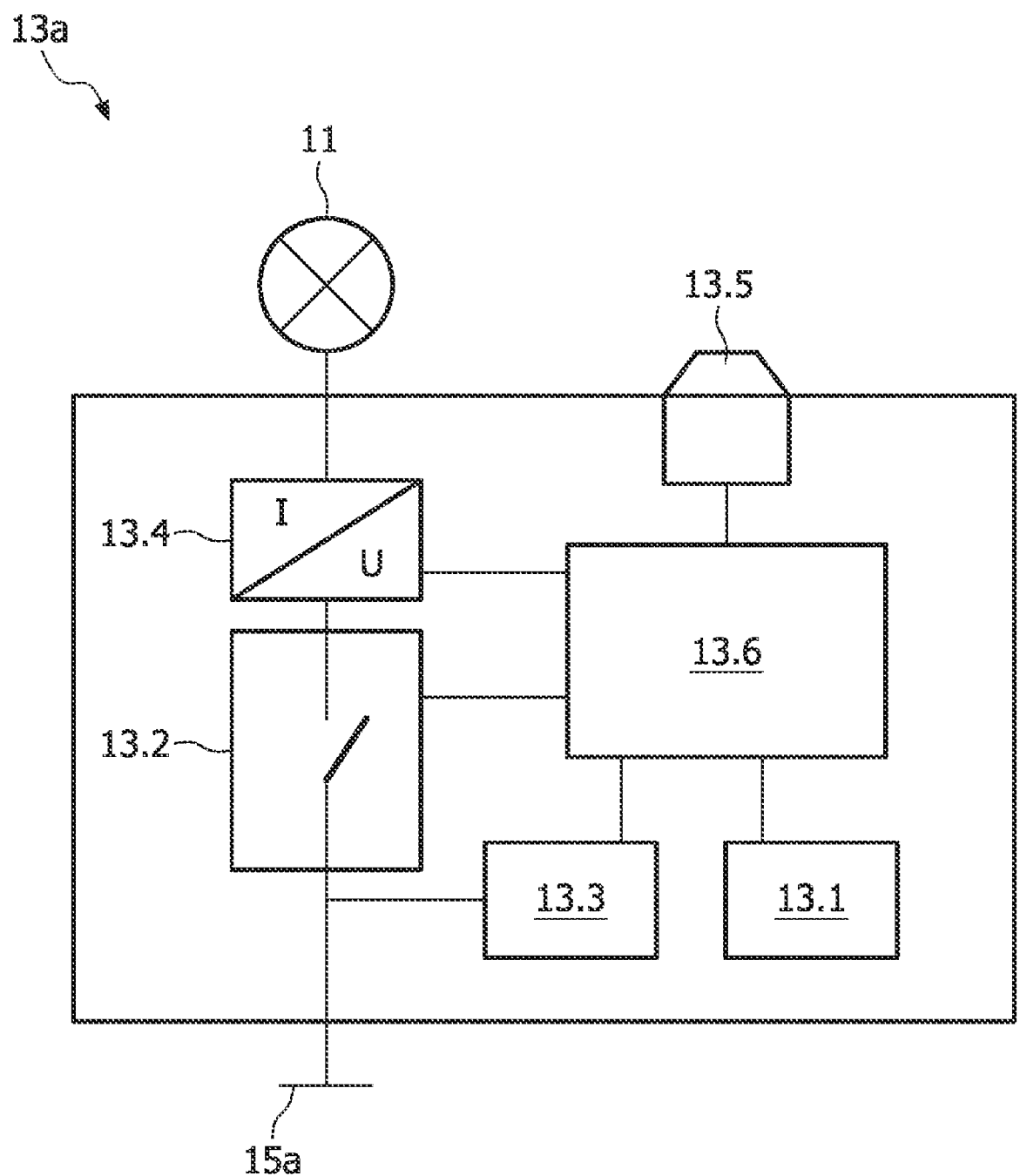
FIG. 3 shows schematically an electronic circuit used in the lighting device according to the present invention.

FIG. 3 shows schematically the components that the electronic circuit 13a (or any other circuit 13b, 23) described above may contain. The circuit 13a is shown to be electrically inserted into the line between the external terminal 15a and the OLED 11. In practice, the external circuit may further be connected to other internal or external terminals, to additional electrodes of the OLED, or to any other electronic component of interest. The electronic circuit 13a comprises the following (optional) components:

A memory 13.1 for storing information like an address of the lighting device or operational parameters. The memory may particularly be realized by a programmable read-only memory (PROM, EPROM etc).

A switching module 13.2 by which for example the connection between the external terminal 15a and the OLED 11 can be interrupted. Such an interruption may particularly take place if some failure is detected, e.g. a short within the OLED 11 or somewhere else.

A communication module 13.3 which allows a uni- or bidirectional communication with external devices. The communication module 13.3 is shown to be connected to the external terminal 15a to realize a communication by wire. Alternatively, the communication module might be connected to a terminal of its own and/or comprise a receiver or transmitter for a wireless communication by RF-signals.

A current converter 13.4 which converts an externally applied voltage into a current needed to drive the OLED 11. The characteristic of this converter may optionally be dependent on the contents of the memory 13.1 or may in some other way be changeable.

A sensor 13.5, for example a photodiode that measures the ambient light and allows to adapt the brightness and/or color of the OLED 11 accordingly.

A control module 13.6 connected to the aforementioned modules 13.1 to 13.5 and adapted to synchronize and control their overall behavior. The control module may for example be realized by a microcontroller.

In summary, the invention relates to a lighting device 10, 20 with a housing 12, 22 that at least partially embeds an OLED 11, 21 and an electronic circuit 13*a*, 13*b*, 23 which affects the flow of electrical power from an external terminal 15*a*, 15*b*, 25 to the OLED. The electronic circuit may comprise a memory module, a communication module, a sensor etc. for allowing an intelligent control of the OLED and for making the lighting device adaptable to possible changes in driving standards.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A lighting device adapted to fit into a corresponding socket, the device comprising
   an OLED;
   a housing that at least partially embeds the OLED;
   at least one external terminal on the surface of the housing;
   an electronic circuit disposed in the housing and comprising passive and/or active electronic components that affect the flow of power from the external terminal to the OLED, and a programmable memory module for storing information that identifies the device and/or that affects the behavior of the circuit.

2. The lighting device according to claim 1, wherein the OLED and the housing are connected to form a unitary structure.

3. The lighting device according to claim 1, wherein the electronic circuit comprises a switching module for changing the routing of the external terminal in case of a failure.

4. The lighting device according to claim 1, wherein the electronic circuit comprises a communication module for a uni- or bi-directional communication with external devices.

5. The lighting device according to claim 1, wherein the electronic circuit further comprises a converter module for converting a voltage applied to the external terminal into a current.

6. The lighting device according to claim 1, wherein the electronic circuit further comprises a sensor for detecting light, temperature, sound and/or proximity of an object.

7. The lighting device according to claim 6, wherein the behavior of the electronic circuit is affected by the signal of the sensor.

8. The lighting device according to claim 1, wherein the electronic circuit further comprises a control module for controlling the brightness and/or the color of the OLED.

9. The lighting device according to claim 1, wherein the electronic circuit is disposed in a recess of the housing.

10. A lighting device adapted to fit into a corresponding socket, the device comprising:
    an OLED;
    a housing that at least partially embeds the OLED;
    at least one external terminal on the surface of the housing; and
    an electronic circuit disposed in the housing and comprising passive and/or active electronic components that affect the flow of power from the external terminal to the OLED, and a switching module for changing the routing of the external terminal in case of a failure.

* * * * *